United States Patent [19]
Fox

[11] 4,337,907
[45] Jul. 6, 1982

[54] SEAT BELT RETRACTOR WITH ELECTRICAL SWITCH

[75] Inventor: William R. Fox, Warren, Mich.

[73] Assignee: Allied Corporation, Morris Township, Morris County, N.J.

[21] Appl. No.: 164,478

[22] Filed: Jun. 30, 1980

[51] Int. Cl.³ .................... A62B 35/00; B65H 75/48
[52] U.S. Cl. .................................. 242/107.7; 280/808
[58] Field of Search .................. 242/107.4 R-E, 242/107.6, 107.7; 200/61.58 B; 180/268-270; 280/806, 807, 808; 297/475-479

[56] References Cited

U.S. PATENT DOCUMENTS

| | | |
|---|---|---|
| 3,830,444 | 8/1974 | Sargeant ..................... 242/107.4 R |
| 3,866,854 | 2/1975 | Wehner ........................ 242/107.4 R |
| 3,876,031 | 4/1975 | Stouffer ....................... 242/107.4 R |
| 4,163,880 | 8/1979 | Stephenson et al. ........ 242/107.4 R |
| 4,198,011 | 4/1980 | Kamijo et al. .................. 242/107.7 |

Primary Examiner—John M. Jillions
Attorney, Agent, or Firm—Roger H. Criss

[57] ABSTRACT

A dual spool seat belt retractor including a housing and lap and shoulder belt retractors mounted therein. An electric switch is provided for controlling an electric signal device, preferably used in conjunction with tension relieving means. The switch is preferably placed in its electrically conductive position in response to a predetermined number of revolutions of the lap belt retractor in the rewind direction.

16 Claims, 3 Drawing Figures

SEAT BELT RETRACTOR WITH ELECTRICAL SWITCH

BACKGROUND OF THE INVENTION

Field of the Invention

Seat belt retractors are known which incorporate an electric switch to activate a signal, either audible and/or visible, to alert the driver and occupants when a seat belt is not being used. This is also true of dual spool retractors which include separate spools contained within a common housing. A common arrangement has been to provide a sensor to activate the switch. Such a sensor slidably contacts the roll of webbing on a spool as the webbing is withdrawn, and mechanically operates the switch when the diameter of the roll has been reduced by a predetermined amount. Reference is made to U.S. Pat. No. 4,163,880 to Stephenson et al. for a switch of this type.

It has been suggested in U.S. patent application Ser. No. 089,648, filed Oct. 29, 1979 of Ocker et al., to provide a dual spool seat belt retractor with a comfort mechanism; such retractor may accommodate the above-referenced switch.

It would be desirable to provide an improved and simplified switch assembly for seat belt retractors and particularly dual spool seat belt retractors having a comfort mechanism.

SUMMARY OF THE INVENTION

In accordance with this invention there is provided in a dual spool seat belt retractor including a housing, a lap belt retractor mounted in the housing and adapted to store a lap belt thereon, a shoulder belt retractor mounted in the housing and adapted to store a shoulder belt thereon, the retractors being rotatable in rewind and extraction directions, rewind means associated with the retractors and normally exerting a rewind force urging the retractors towards the rewind direction, tension relieving means operatively associated with said shoulder belt retractor and effective in an operable position to relieve the rewind force associated with the shoulder belt retractor while being ineffective in an inoperable position to relieve such force, release means operable to position the tension relieving means in its inoperable position, the improvement comprising:

electric switch means for the control of an electrically activated signal device, the switch means being mounted on the housing and actuated by motion of the release means, whereby the switch is moved to a first electrical position when the tension relieving means is in its inoperable position, and is moved to a second electrical position when the tension relieving means is in its operable position.

Preferably, the release means is actuable to position the switch in its conducting condition in response to a predetermined number of revolutions of the lap belt retractor in the rewind direction and is also actuable to position the switch in its non-conducting condition in response to a predetermined number of revolutions of the lap belt retractor in the extraction direction. The release means preferably includes a step reduction gear mechanism to control actuation of the electric switch as well as the tension relieving means.

Also in accordance with this invention, there is provided a seat belt retractor comprising;

a housing;

at least one spool of seat belt webbing mounted in the housing for rotation in rewind and extraction directions;

rewind means connected to the spool to urge the spool towards the rewind direction;

lever means pivotably mounted on the housing for movement in a direction axially towards and away from the spool; and switch means actuatable in response to the pivotable motion of the lever means to control an electrically activated signal device, the lever means being pivotably movable to a first position axially of the spool in response to a predetermined amount of rotation of the spool in the extraction direction, whereby the switch means is actuated, thereby deactivating the signal device.

DESCRIPTION OF THE PREFERRED EMBODIMENT

Figure 1:
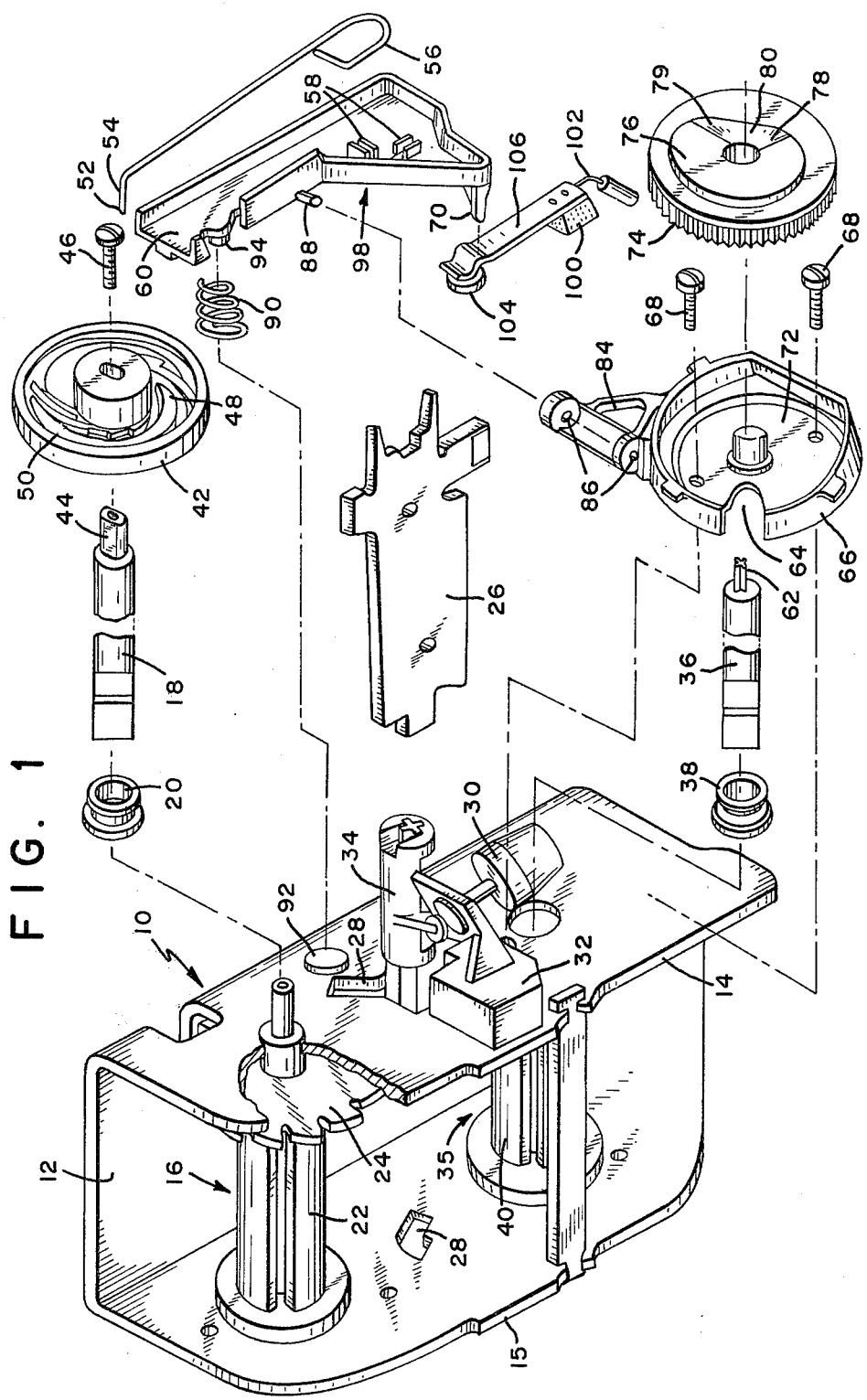
FIG. 1 is an exploded view of a dual seat belt retractor including the electrical switch of this invention.
Figure 2:
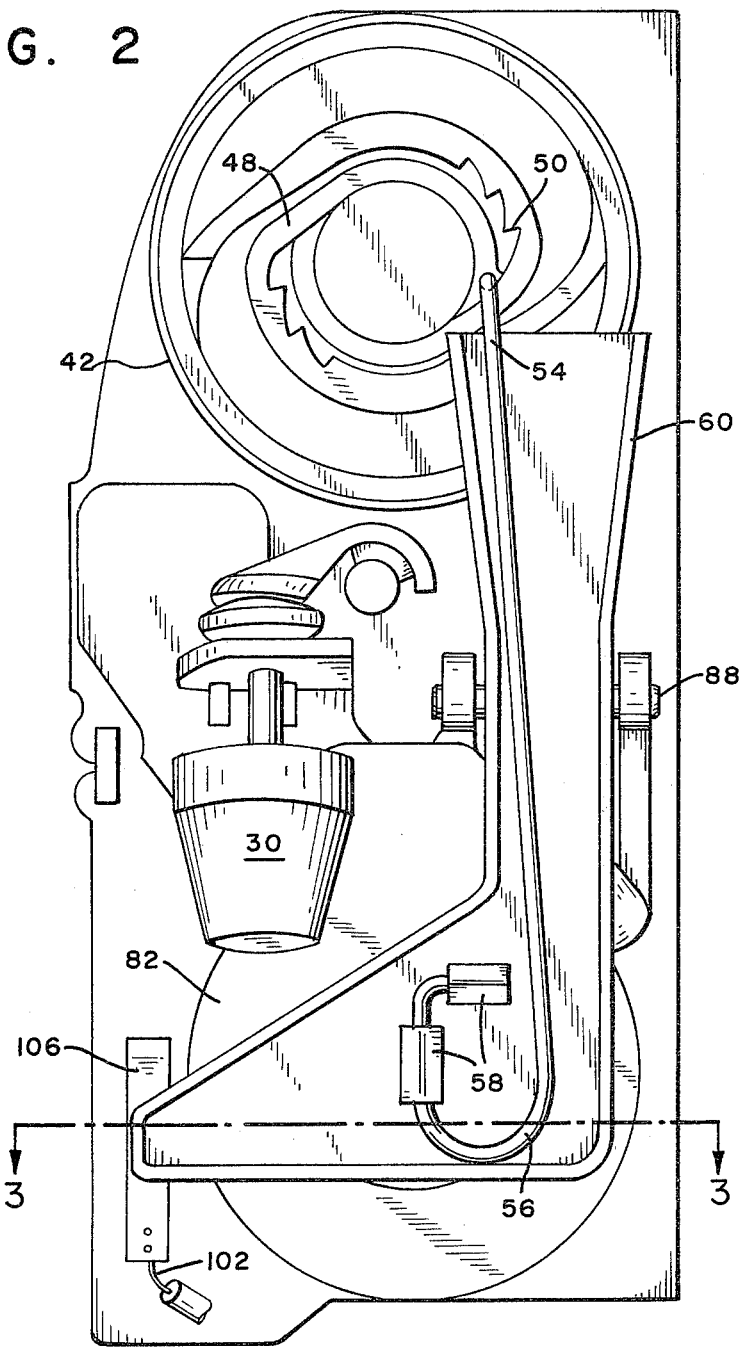
FIG. 2 is a side view of the retractor of FIG. 1.

With reference to the drawings, there is shown a dual spool retractor 10 including a U-shaped base having upstanding side flanges 14 and 15. A shoulder belt retractor 16 including a shaft 18 is journaled in bushing 20 for rotation in flanges 14 and 15 and a spool 22 mounted on shaft 18 is adapted to receive seat belt webbing (not shown). A locking gear 24 is mounted on shaft 18 interior of flange 14 and is adapted to be engaged by a locking pawl 26 pivotably mounted in openings 28 in flanges 14 and 15 in response to actuation by a pendulum 30 mounted in a carrier 32 on the exterior of flange 14 when the vehicle in which the retractor is mounted is subject to a deceleration force. A plastic extension 34 serves to transfer motion of the pendulum cap to pawl 26. Mounted below shoulder belt retractor 16 in flanges 14 and 15 is a lap belt retractor 35 including a shaft 36 journaled for rotation in bushing 38 in flange 14. A spool 40 is mounted on shaft 36 and is likewise adapted to receive seat belt webbing (not shown). Shaft 36 also carries a locking gear (not shown) which is likewise adapted to be engaged by locking pawl 26. Rewind springs (not shown) are mounted exteriorly of flange 15 and are coupled respectively to shafts 18 and 36 to bias the shafts in a rewind direction. A dual spool retractor of this type is described in U.S. Pat. No. 4,135,683 to Stephenson et al.

A plastic scroll plate 42 is mounted on a keyed extension 44 of shoulder belt retractor shaft 18 which extends exteriorly of flange 14. Screw 46 fixes scroll plate 42 for rotation with shaft 18. A plurality of tracks 48 and locking recesses (hooks) 50 are provided on the exterior surface of scroll plate 42. End 52 of spring follower 54 is adapted to be received in tracks 48 and hooks 50 in a manner disclosed, for example, in U.S. Pat. No. 4,002,311 to Fisher et al. to provide a tension elimination comfort mechanism to block scroll plate 42 and hence shaft 18 from rewind rotation due to the bias of the shoulder belt retractor rewind spring. Spring follower 54 has a looped end 56 which is received in channels 58 of a plastic spring rocker 60, with end 52 being biased towards the center of scroll plate 42.

A dual seat belt retractor of the type described above is more fully described in the aforementioned patent application Ser. No. 089,648 the disclosure of which is expressly incorporated herein by reference.

A spur gear 62 is mounted on the end of lap belt retractor shaft 36 and extends through an opening 64 in a housing 66 which is mounted via screws 68 to the exterior of flange 14. A larger driven gear 74 having external teeth is retained in housing 66. Gear 74 rotates on post 72 provided centrally in housing 66 and its teeth mesh with the teeth of spur gear 62. The exterior surface of gear 74 has an outwardly extending cam protrusion 76 which extends almost circumferentially but terminates in inclined portions 78 and 79 which extend to a recessed or valley portion 80 on the exterior surface of driven gear 74.

An extension 84 of housing 66 includes recesses 86 which receives a lateral post 88 of spring rocker 60. Spring rocker 60 is thus pivotably mounted for movement for limited rocking motion towards and away from flange 14. A spring 90 extends between a post 92 on flange 14 and post 94 on spring rocker 60 to bias the upper portion of spring rocker 60 away from the flange 14. Boss 96 on interiorly facing surface 98 of the lower end of spring rocker 60 is adapted to be in sliding contact with cam portion 76 of driven gear 74 when seat belt webbing is extracted away from lap belt retractor 35 and with valley portion 80 when seat belt webbing is fully or nearly fully stored on spool 40 of lap belt retractor 35.

An arm 70 also extends from the interiorly facing surface 98 of the lower end of spring rocker 60 and is positioned directly over the free end of an upwardly biased strip of electrically conductive resilient material 106 (preferably spring metal) extending substantially parallel to flange 14 from an electrically insulating support 100 to which its other end is fixed. Support 100 is attached to flange 14 and serves to support biased strip conductor 106 as well as to electrically insulate it from flange 14. The free end of the biased strip conductor 106 together with a contact point 104 of flange 14 comprises an electric switch. This switch is in a first closed conducting position when boss 96 of spring rocker 60 is in contact with the valley portion 80 of the cam surface of driven gear 74 and spring 90 has urged the spring rocker 60 away from the scroll plate 42 causing arm 70 of the spring rocker 60 to depress strip conductor 106 against its bias, into electrical contact with contact 104 on flange 14. The electric switch is in its second open nonconductive position when boss 96 of spring rocker 60 is in contact with the raised portion 76 of the cam surface of driven gear 74, and arm 70 has been raised to permit strip conductor 106 to separate from contact point 104. Contact point 104 may be the point of contact on the surface of flange 14, or a raised point on the surface such as the head of a rivet extending into or through flange 14.

The fixed end of strip conductor 106 is attached to a conductor 102 connected to an electrically operated signal device such as a light or buzzer not shown, which is in a circuit with a source of electrical energy, such as the service battery of the vehicle. In the first closed conducting position of the switch, the circuit is completed when the strip conductor 106 contacts point 104 which commonly is grounded to the frame of the vehicle, as is the service battery.

Figure 3:
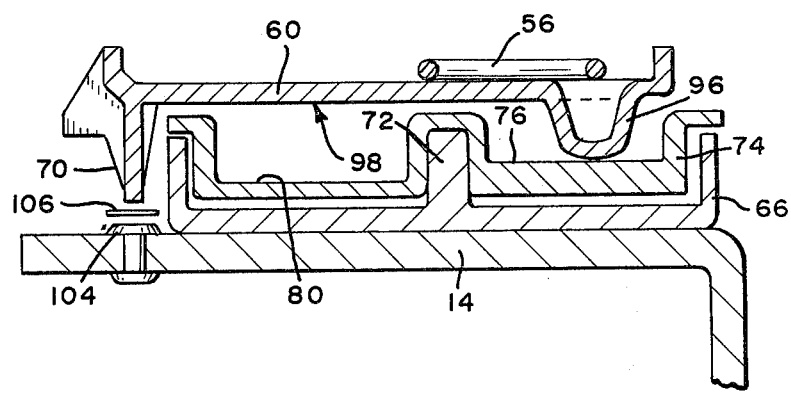
FIG. 3 is a cross-sectional view of a portion of the retractor taken along lines 3—3 of FIG. 2.

In operation of the above-described embodiment, when the lap and shoulder belts are in their normally stowed positions, boss 96 of spring rocker 60 is in contact with valley 80 on the exterior surface of driven gear 74 so that the upper portion of spring rocker 60 is pivoted away from scroll plate 42 due to the bias of its spring 90. End 52 of spring follower 54 is thus held away from scroll plate 42 and the rewind spring associated with the shoulder belt retractor 16 is biasing the shoulder belt in the rewind direction. Extending arm 70 urges strip conductor 106 into electrical contact with contact 104, thereby closing a circuit including a signal device. The relation between spur gear 62 and driven gear 74 is chosen so that as the lap belt (and shoulder belt) is extended from its retractor due to the occupant moving the tongue portion of a buckle assembly which is interfitted between the lap and shoulder belts portions towards the buckle, shaft 36 of lap belt retractor 35 rotates in an extraction direction which causes rotation of driven gear 74 in the opposite direction due to its meshing with spur gear 62 at the end of shaft 36. Due to the gear ratios, driven gear 74 rotates only a small portion of a revolution for each complete revolution of spur gear 62. Boss 96 is riding within valley 80 when the lap belt retractor is initially extended. As additional webbing is extended from lap belt retractor 35 so that shaft 36 further rotates in the extraction direction and causes additional rotation of driven gear 74, boss 96 rides up ramp 79 and onto cam portion 76 (FIG. 3). For example, the gear ratios may be selected such that when about two wraps of lap belt webbing are removed from the lap belt retractor, driven gear 74 has rotated about ⅓ of a revolution to position the cam portion such that the boss rides up ramp 79. At this point, spring rocker 60 is pivoted on its post 88 against the bias of its spring 90 with the result that end 52 of spring follower 54 becomes engaged with scroll plate 42 at the radially inward portion of one of its tracks and is thus in its operable position. At the same time extending arm 70 of the lower portion of the spring rocker 60 is moved outwardly away from strip conductor 106 as shown in FIG. 3, allowing the strip conductor to separate itself from contact point 104 on flange 14 because of its upward bias, thus breaking electrical contact and interrupting the circuit which includes the signal device.

Further extension of the shoulder belt webbing causes rotation of shaft 18 and hence scroll plate 42, with end 52 of spring follower 54 moving spirally outward along the track. Further protraction and slight retraction motion results in end 52 being positioned in one of the hooks 50 in a manner described in the aforementioned patent application and U.S. Pat. No. 4,002,311. At this point, the rewind force of the shoulder belt retractor rewind spring is blocked out and as a result the tension of the shoulder belt retractor against the occupant's torso is eliminated. The rewind force of a shoulder belt retractor rewind spring may be reestablished by extending the belts such that end 52 of spring follower 54 is moved to the end of the corresponding track, whereby spring action of the follower 54 moves end 52 again to the center of scroll plate 42, as described in the Fisher et al. patent.

In accordance with this invention, when the shoulder and lap belts are released such as occurs by release of the tongue plate from a seat belt buckle assembly by the occupant preparatory to leaving the vehicle, if the tension eliminator for the shoulder belt retractor 16 has not been engaged then both the lap and shoulder belts are wound up by their respective rewind springs in a normal fashion. However, should the tension eliminator be engaged, only lap belt retractor 35 will initially be rotated in the rewind direction due to the force of its rewind spring and lap belt webbing will initially be wound up. When lap belt retractor shaft 36 has rotated sufficiently in the rewind direction so that the lap belt is almost in a fully stowed position on spool 40, driven gear 74 has been rotated by spur gear 62 to a circumferential position at which boss 96 of spring rocker 60 rides down ramp 79 from cam portion 76 to valley 80 on the face of driven gear 74. As a result, spring rocker 60 is pivoted on its post 88 with the upper portion of spring rocker 60 being moved away from scroll plate 42 due to the bias of spring 90, whereby end 52 of spring follower 54 is moved and held away from scroll plate 42. The tension elimination mechanism is thus deactivated and the shoulder belt is rewound onto spool 22 due to the force of the shoulder belt retractor rewind spring. At the same time, projecting arm 70 urges strip conductor 106 into electrical contact with contact point 104, thus closing the circuit and activating the signaling device. Thus, energy is stored in spring 90, which is compressed as a result of rotation of the lap belt retractor in the extraction direction. The comfort mechanism is moved to its inoperable position due to release of the stored energy as spring 90 expands after the lap belt retractor has been rotated sufficiently in the rewind direction. The switch mechanism is moved to its contact position as a result of the same motion.

It can be seen that the present invention provides a dual spool seat belt retractor of the type including a comfort mechanism feature, which includes a simple electric switch for activating a signal device which is in an active state when the vehicle is in use and the seat belt is not in use, and in a passive state when the vehicle is in use and the seat belt has been employed. The present invention also provides a simple reduction gear consisting of only two gears, thus eliminating the need for an idler gear. Although the spring rocker 60 and the electric switch mechanism has been described as applied to a dual spool seat belt retractor with comfort feature, it would also apply to dual spool seat belt retractors without the comfort feature, as well as to single spool seat belt retractors. In addition, it should be noted that the switch may be designed so as to be normally opened and to be moved to a closed position upon extraction of the lap belt retractor webbing as described above.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. In a dual spool seat belt retractor including a housing, a lap belt retractor mounted in said housing and adapted to store a lap belt thereon, a shoulder belt retractor mounted in said housing and adapted to store a shoulder belt thereon, said retractors being rotatable in rewind and extraction directions, rewind means associated with said retractors and normally exerting a rewind force urging said retractors towards the rewind direction, tension relieving means operatively associated with said shoulder belt retractor and effective in an operable position to relieve the rewind force associated with said shoulder belt retractor and ineffective in an inoperable position to relieve said force and release means operable to position said tension relieving means in its inoperable position, the improvement comprising:
electric switch means for the control of an electrically activated signal device, said switch means being mounted on said housing and actuated by motion of said release means, whereby said switch means is moved to a first electrical position when said tension relieving means is in its inoperable position and is moved to a second electrical position when said tension relieving means is in its operable position.

2. The dual spool retractor of claim 1 wherein said release means is actuable to position said electric switch means to its first position in response to a predetermined number of revolutions of said lap belt retractor in said rewind direction.

3. The dual spool retractor of claim 2 wherein said release means is actuable to position said electric switch means to its second position in response to a predetermined number of revolutions of said lap belt retractor in said extraction direction.

4. The dual spool retractor of claim 3 including a shaft for said lap belt retractor and a reduction gear mechanism operatively associated with said shaft and operable to control said release means.

5. The dual spool retractor of claim 4 wherein said reduction gear mechanism comprises a smaller driving spur gear provided on said shaft and a larger meshing driven gear provided on said housing, rotary motion of said driven gear controlling movement of said electrical switch means between its first and second positions and said tension relieving means between its inoperable and operable positions.

6. The dual spool retractor of claim 5 wherein said release means includes a member pivotably mounted on said housing for limited rocking motion, said pivotably mounted member comprising first and second laterally extending members, said first member being in a sliding relationship with said driven gear, said second member being actuatable to contact said electrical switch, and biasing means for biasing said pivotably mounted member so that its first and second members contact said driven gear and said electric switch, respectively.

7. The dual spool retractor of claim 6 including contacting means on said driven gear comprising said outwardly extending cam surface including an elevated portion and a recessed portion, said first member of said pivotable member being slidable into contact with said elevated and recessed portions, contact of said first member and said recessed portion effective to permit said second member of said pivotable member to move toward said electric switch due to the bias of said biasing means whereby said electric switch is moved to its conducting position, and contact of said first member with said elevated portion being effective to move said first member away from said electric switch, whereby said switch is moved to its non-conducting position.

8. The dual spool retractor of claim 7 wherein said first member of said pivotable member is in contact with said recessed portion when said lap belt is stored on said lap belt retractor and is movable into contact with said elevated portion upon rotation of said lap belt retractor in the extraction direction.

9. The dual spool retractor of claim 7 wherein said electric switch means comprises a flexible contact arm mounted on said housing and movable to position one end thereof into electrical contact with a contact means mounted on said retractor in response to contact by said second member of said pivotable member.

10. The dual spool retractor of claim 1 including spools for each of said lap and shoulder belt retractors upon which said belts are respectively wound, and wherein said release means is pivotably mounted in said housing for limited rocking movement in a direction axially towards and away from said spool of said lap belt retractor in response to a predetermined amount of rotation of said spool of said lap belt retractor.

11. The dual spool retractor of claim 10 wherein said release means is movable to a first axial position to move said tension relieving means to its inoperable position in response to a predetermined amount of rotation of said lap belt retractor in said rewind direction and wherein said release means is movable to a second axial position to move said tension relieving means to its operable position in response to a predetermined rotation of said lap belt retractor in said extraction direction.

12. A seat belt retractor comprising:
a housing;
at least one spool of seat belt webbing mounted in said housing for rotation in rewind and extraction directions;
rewind means connected to said spool to urge said spool towards the rewind direction;
lever means pivotably mounted on said housing for movement in a direction axially towards and away from said spool;
switch means actuatable in response to said pivotable motion of said lever means to control an electrically activated signal device, said lever means being pivotably movable to a first position axially of said spool in response to a predetermined amount of rotation of said spool in the extraction direction, whereby said switch means is actuated, thereby deactivating said signal device; and
a comfort mechanism operatively associated with said spool and operable to at least reduce the force of said rewind means acting in the rewind direction;
wherein one end of said lever means includes first contact means engageable with said comfort mechanism to actuate said comfort mechanism in response to said pivotable movement of said lever means and wherein an opposite end of said lever means includes second contact means engageable with said switch means to actuate said switch means.

13. The seat belt retractor of claim 12 wherein said lever means is pivotably movable to a second position axially opposite of said first position in response to rotation of said spool in the retraction direction, whereby said switch means is actuated to activate said signal means.

14. The seat belt retractor of claim 13 wherein said switch means is actuatable to an electrically open position in response to said pivotable movement of said lever means to its first position.

15. A seat belt retractor comprising:
a housing;
two spools of seat belt webbing mounted in said housing for rotation in rewind and extraction directions, a first of said spools having lap belt webbing stored thereon and a second of said spools having shoulder belt webbing stored thereon;
rewind springs connected to said spools to urge said spools towards the rewind direction;
lever means pivotably mounted on said housing for movement in a direction axially towards and away from said spools, said lever means being operatively associated with said first spool;
switch means actuatable in response to said pivotable motion of said lever means to control an electrically activated signal device, said lever means being pivotably movable to a first position axially of said spool in response to a predetermined amount of rotation of said first spool in the extraction direction, whereby said switch means is actuated, thereby deactivating said signal device, and said lever means being pivotably movable to a second position axially opposite of said first position in response to rotation of the first spool in the retraction direction, whereby said switch means is actuated to activate said signal means; and
a comfort mechanism operatively associated with said second spool and operable to at least reduce the force of said rewind means acting in the rewind direction, said comfort mechanism being actuated in response to said pivotable movement of said lever means.

16. The seat belt retractor of claim 15 including first contact means on one end of said lever means engageable with said comfort mechanism to actuate said comfort mechanism and second contact means on the opposite end of said lever means engageable with said switch means to actuate said switch means.

* * * * *